(12) United States Patent
Hong (10) Patent No.: US 10,837,785 B2
(45) Date of Patent: Nov. 17, 2020

(54) METHOD FOR UPDATING A DIGITAL NAVIGATION MAP

(71) Applicant: AUDI AG, Ingolstadt (DE)

(72) Inventor: Jihun Hong, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/771,589

(22) PCT Filed: Nov. 5, 2018

(86) PCT No.: PCT/EP2018/080122
§ 371 (c)(1),
(2) Date: Jun. 10, 2020

(87) PCT Pub. No.: WO2019/115091
PCT Pub. Date: Jun. 20, 2019

(65) Prior Publication Data
US 2020/0300640 A1    Sep. 24, 2020

(30) Foreign Application Priority Data

Dec. 12, 2017    (DE) .......................... 10 2017 222 496

(51) Int. Cl.
*G01C 21/32* (2006.01)
(52) U.S. Cl.
CPC .................................. *G01C 21/32* (2013.01)
(58) Field of Classification Search
CPC ..................................................... G01C 21/32
See application file for complete search history.

(56) References Cited

U.S. PATENT DOCUMENTS

| 6,075,467 | A | 6/2000 | Ninagawa |
| 10,036,646 | B2 | 7/2018 | Schumann et al. |
| 10,060,751 | B1* | 8/2018 | Chen ............ G01C 21/32 |
| 10,267,639 | B2* | 4/2019 | Mishra ............ H04W 4/029 |
| 10,279,757 | B2 | 5/2019 | Netter |
| 2009/0182496 | A1 | 7/2009 | Tanabe |
| 2014/0025292 | A1 | 1/2014 | Stahlin et al. |

(Continued)

FOREIGN PATENT DOCUMENTS

| DE | 19837618 A1 | 3/1999 |
| DE | 102008054572 A1 | 7/2009 |

(Continued)

OTHER PUBLICATIONS

International Search Report and Written Opinion of the International Searching Authority directed to related International Patent Application No. PCT/EP2018/080122, dated Feb. 11, 2019, with attached English-language translation; 17 pages.

(Continued)

*Primary Examiner* — Richard M Camby
(74) *Attorney, Agent, or Firm* — Sterne, Kessler, Goldstein & Fox, P.L.L.C.

(57) ABSTRACT

The present application relates to a method for updating a digital navigation map comprising a plurality of map segments, in which a back-end system provides a plurality of update packets each associated with a map segment of the digital navigation map and an update packet provided is transferred into a terminal device of a user.

8 Claims, 8 Drawing Sheets

(56) References Cited

U.S. PATENT DOCUMENTS

2015/0355899 A1    12/2015    Agarwal et al.
2018/0066957 A1*    3/2018    Stroila ............... G01C 21/3446

FOREIGN PATENT DOCUMENTS

| | | |
|---|---|---|
| DE | 102012212740 A1 | 5/2014 |
| DE | 102015000403 B3 | 5/2014 |
| DE | 102015014049 A1 | 5/2017 |
| EP | 1870671 A1 | 12/2007 |
| EP | 1909068 A2 | 4/2008 |

OTHER PUBLICATIONS

International Preliminary Report on Patentability directed to related International Patent Application No. PCT/EP2018/080122, completed Mar. 26, 2020, with attached English-language translation; 14 pages.

* cited by examiner

| Priority | Reason for prioritization | Criterion for prioritization |
|---|---|---|
| 1 | STAY or AROUND CCP tag | a closer update note has higher priority |
| 2 | Place of destination-note | a closer update note has higher priority |
| 3 | ALONG-THE-ROUTE tag | a closer update note has higher priority |
| 4 | If there DESTINATION tag: adjacent regions of the destination. * adjacent regions - regions which their borders are connected to each other. | a closer update note has higher priority |
| 5 | If the current user position is NOT in HOME region: adjacent regions of the current region. | a closer update note has higher priority |
| 6 | READY tag which is assigned in the last two weeks & within xx km from the current user position | a newer update note has higher priority |
| 7 | NO-WAITING tag which is assigned in the last two weeks. | a newer update note has higher priority |
| 8 | WAITING tag | a newer update note has higher priority |
| 9 | EX-DESTINATION which is assigned in the last two months. | a newer update note has higher priority |
| 10 | EX-PASS which is assigned in the last two months. | a newer update note has higher priority |
| 11 | All place of residence/place of work notes | a closer update note has higher priority |
| 12 | All the rest WAITING tags. | a newer update note has higher priority |
| 13 | All the rest READY tags. | a newer update note has higher priority |
| 14 | All the rest EX-DESTINATION tags. | a newer update note has higher priority |
| 15 | All the rest EX-PASS tags. | a newer update note has higher priority |
| 16 | All the regions within 200km from a user. | a closer update note has higher priority |
| 17 | All the regions within 200km from the center position of HOME. | a closer update note has higher priority |
| 18 | All the regions within 200km from the center position of WORK. | a closer update note has higher priority |
| 19 | All the regions within 200km from EX-DESTINATIONs. | a closer update note has higher priority |
| 20 | All the rest regions with concentric circle from a user location until the whole market is covered. | , |

Fig. 6

Updating via mobile network

Updating via mobile terminal device

Updating via local wireless network

Updating via stationary terminal device and mobile data storage

METHOD FOR UPDATING A DIGITAL NAVIGATION MAP

TECHNICAL FIELD

The present application relates to a method for updating a digital navigation map comprising a plurality of map segments.

BACKGROUND

In many vehicles and mobile terminal devices, for example in tablets or smartphones, digital navigation maps are used to navigate from a starting point to a destination point along a specific or selected route while the respective vehicle or a user of the respective mobile terminal devices is moving. In particular, vehicles with partial or complete self-driving function (autonomous driving) rely on high-precision digital navigation maps.

For safe navigation of a vehicle or a user of a mobile terminal device at all times, it is necessary to always keep a digital navigation map stored in a control unit of the vehicle or in the mobile terminal up to date. This can be achieved by continuously updating the digital navigation map. For this purpose, a more recent version of the digital navigation map is usually transferred from a back-end system to the control unit of the vehicle or the mobile terminal device via a wireless connection.

For the best possible update results, the digital navigation map is updated automatically, i.e. without the initiative of the user, as soon as a more recent version is available on the back-end system. If the vehicle or the user of the mobile terminal device is updated during a movement, however, the navigation function or further functions of the vehicle or the mobile terminal device can be impaired. This is unacceptable, for example, for a safety-critical function of the vehicle.

In order to avoid a functional impairment of the vehicle while driving, the digital navigation map can be updated during a parking phase. However, by transferring a more recent version of the digital navigation map into the control unit of the vehicle and updating the digital navigation map stored in the control unit of the vehicle, electrical energy is consumed which is taken from a battery of the vehicle. There is therefore a risk that the battery will be discharged when updating the digital navigation map during a parking phase of the vehicle to such an extent that the electrical energy remaining in the battery after the update is insufficient for starting the vehicle.

Apart from this, there may be an undefined intermediate state of the digital navigation map in the control unit of the vehicle if the duration of the parking phase is insufficient for a complete update of the digital navigation map. In the undefined intermediate state, the stored digital navigation map can be unusable, which makes it necessary to repeat the update.

For example, DE 10 2015 014 049 A1 discloses a method for updating software that is stored in a control unit of a vehicle. In the method, the software is updated during a parking phase of the vehicle in order to rule out any impairment of the control unit due to an update while the vehicle is traveling. First, an energy requirement for the update is forecasted and an energy reserve of the vehicle is determined. The software is updated on the condition that the energy reserve minus the forecasted energy requirement does not fall below a specific minimum amount. Furthermore, a time requirement for the update can be forecasted and a parking behavior of a driver of the vehicle can be learned. The software is updated when a learned parking period is longer than the forecasted time requirement.

A further problem of a digital navigation map is that it is very complex to detect continuously changing environment and road conditions in order to generate correspondingly adapted, more recent versions of the digital navigation map and to make them available for transfer in a timely manner. As a result, even a recent version of the digital navigation map provided generally differs from the actual environment and road conditions.

To reduce this difference, DE 10 2012 212 740 A1 discloses a system and a method for updating a digital navigation map. The system comprises a back-end server, which provides a digital navigation map for transfer, and a plurality of vehicles, each comprising a control unit with a digital navigation map transferred from the back-end server and stored in the control unit, and at least one environment sensor and/or vehicle sensor. In the method, environment and/or vehicle data are detected with the sensors and transferred to the back-end server. The back-end server determines differences between the navigation map provided and environment and/or vehicle data transferred by the vehicles and updates the navigation map provided according to the differences determined, which is then transferred to the control units of the vehicles.

A digital navigation map usually has a large data volume due to the large area of the depicted area and the corresponding number of details contained. Accordingly, a complete update of the digital navigation map takes a lot of time and also causes high costs, in particular when using a mobile radio connection. As a result, the goal is to reduce the effort for updating the digital navigation map.

For example, EP 1 870 671 A1 discloses a system and a method for updating a digital navigation map which comprises a plurality of square map segments arranged in a grid. The system comprises a vehicle having a control unit and a digital navigation map stored in the control unit and a back-end server having a navigation map stored in the back-end server. Immediately after the vehicle is started, the control unit requests the back-end server to update information relating to a specific square area which has a specific location approximately in the middle thereof, for example a place of residence input by a driver of the vehicle or a place of destination input by the driver. The back-end server then transfers difference information with updated map segments relating to the specific square area to the control unit. On the basis of the difference information, the control unit first requests updated map segments of a central square partial area with decreasing priority, and then in each case the circular partial areas surrounding the central partial area around the place of residence and receives the corresponding updated map segments transferred from the back-end server.

With this method, the back-end server can be subjected to a heavy load if many vehicles request updated map segments at the same time. In addition, map segments that are actually not required can be transferred by the back-end server if the driver of the vehicle does not input a change in the place of residence or the place of destination. The method also uses a mobile network as an update path, which is not available with sufficient quality in some areas.

BRIEF DESCRIPTION OF THE DRAWINGS

FIG. 5 is an enlarged representation of a detail of the detail shown in FIG. 4.

DETAILED DESCRIPTION

The present application relates to a method for updating a digital navigation map comprising a plurality of map segments, in which a back-end system provides a plurality of update packets each associated with a map segment of the digital navigation map and an update packet provided is transferred into a terminal device of a user.

In many vehicles and mobile terminal devices, for example in tablets or smartphones, digital navigation maps are used to navigate from a starting point to a destination point along a specific or selected route while the respective vehicle or a user of the respective mobile terminal devices is moving. In particular, vehicles with partial or complete self-driving function (autonomous driving) rely on high-precision digital navigation maps.

For safe navigation of a vehicle or a user of a mobile terminal device at all times, it is necessary to always keep a digital navigation map stored in a control unit of the vehicle or in the mobile terminal up to date. This can be achieved by continuously updating the digital navigation map. For this purpose, a more recent version of the digital navigation map is usually transferred from a back-end system to the control unit of the vehicle or the mobile terminal device via a wireless connection.

For the best possible update results, the digital navigation map is updated automatically, i.e. without the initiative of the user, as soon as a more recent version is available on the back-end system. If the vehicle or the user of the mobile terminal device is updated during a movement, however, the navigation function or further functions of the vehicle or the mobile terminal device can be impaired. This is unacceptable, for example, for a safety-critical function of the vehicle.

In order to avoid a functional impairment of the vehicle while driving, the digital navigation map can be updated during a parking phase. However, by transferring a more recent version of the digital navigation map into the control unit of the vehicle and updating the digital navigation map stored in the control unit of the vehicle, electrical energy is consumed which is taken from a battery of the vehicle. There is therefore a risk that the battery will be discharged when updating the digital navigation map during a parking phase of the vehicle to such an extent that the electrical energy remaining in the battery after the update is insufficient for starting the vehicle.

Apart from this, there may be an undefined intermediate state of the digital navigation map in the control unit of the vehicle if the duration of the parking phase is insufficient for a complete update of the digital navigation map. In the undefined intermediate state, the stored digital navigation map can be unusable, which makes it necessary to repeat the update.

For example, DE 10 2015 014 049 A1 discloses a method for updating software that is stored in a control unit of a vehicle. In the method, the software is updated during a parking phase of the vehicle in order to rule out any impairment of the control unit due to an update while the vehicle is traveling. First, an energy requirement for the update is forecasted and an energy reserve of the vehicle is determined. The software is updated on the condition that the energy reserve minus the forecasted energy requirement does not fall below a specific minimum amount. Furthermore, a time requirement for the update can be forecasted and a parking behavior of a driver of the vehicle can be learned. The software is updated when a learned parking period is longer than the forecasted time requirement.

A further problem of a digital navigation map is that it is very complex to detect continuously changing environment and road conditions in order to generate correspondingly adapted, more recent versions of the digital navigation map and to make them available for transfer in a timely manner. As a result, even a recent version of the digital navigation map provided generally differs from the actual environment and road conditions.

To reduce this difference, DE 10 2012 212 740 A1 discloses a system and a method for updating a digital navigation map. The system comprises a back-end server, which provides a digital navigation map for transfer, and a plurality of vehicles, each comprising a control unit with a digital navigation map transferred from the back-end server and stored in the control unit, and at least one environment sensor and/or vehicle sensor. In the method, environment and/or vehicle data are detected with the sensors and transferred to the back-end server. The back-end server determines differences between the navigation map provided and environment and/or vehicle data transferred by the vehicles and updates the navigation map provided according to the differences determined, which is then transferred to the control units of the vehicles.

A digital navigation map usually has a large data volume due to the large area of the depicted area and the corresponding number of details contained. Accordingly, a complete update of the digital navigation map takes a lot of time and also causes high costs, in particular when using a mobile radio connection. As a result, the goal is to reduce the effort for updating the digital navigation map.

For example, EP 1 870 671 A1 discloses a system and a method for updating a digital navigation map which comprises a plurality of square map segments arranged in a grid. The system comprises a vehicle having a control unit and a digital navigation map stored in the control unit and a back-end server having a navigation map stored in the back-end server. Immediately after the vehicle is started, the control unit requests the back-end server to update information relating to a specific square area which has a specific location approximately in the middle thereof, for example a place of residence input by a driver of the vehicle or a place of destination input by the driver. The back-end server then transfers difference information with updated map segments relating to the specific square area to the control unit. On the basis of the difference information, the control unit first requests updated map segments of a central square partial area with decreasing priority, and then in each case the circular partial areas surrounding the central partial area around the place of residence and receives the corresponding updated map segments transferred from the back-end server.

With this method, the back-end server can be subjected to a heavy load if many vehicles request updated map segments at the same time. In addition, map segments that are actually not required can be transferred by the back-end server if the driver of the vehicle does not input a change in the place of residence or the place of destination. The method also uses a mobile network as an update path, which is not available with sufficient quality in some areas.

The application is therefore based on the object of proposing an improved method for updating a digital navigation map comprising a plurality of map segments, which is more flexible and avoids the disadvantages described.

The present application relates to a method for updating a digital navigation map comprising a plurality of map segments, in which a back-end system provides a plurality of update packets each associated with a map segment of the digital navigation map, and an update packet provided is transferred to a terminal device of a user. The back-end system provides a versioned update packet for each map segment of the digital navigation map in order to distribute it to many terminal devices. With the update packets provided, a digital navigation map installed in a terminal device can be updated individually and partially, i.e. by installing individual map segments that are adapted to a behavior or an interest of the user. The back-end system can be one or more back-end servers, which are operated by a provider of the digital navigation map, or a special area of a generally accessible Internet cloud. A person skilled in the art is familiar with the fact that the communication required for this is only permitted by the back-end system after the user has been authenticated and authorized. In the method, a transfer protocol is advantageously used for the transfer of update packets, according to which the transfer of an update packet into a user's terminal device is interrupted at any time and continued after an interruption. In this way, repeated partial transfer of an update packet can be prevented.

According to the application, the terminal device automatically requests from the back-end system any update packet provided, which is referenced from a packet reference of a transfer entry of a transfer list generated and transferred by the back-end system, according to the order of the transfer entries in the transfer list. In this way, the prerequisite for a hybrid update logic is created, according to which the back-end system has a significant influence on which map segments are transferred to the terminal device, in what order, and at what point in time. In contrast to the usual update logic, the back-end system can therefore mainly act as a master. As a result, the sequence of the method can be changed at any time simply by intervening in the back-end system, i.e. without configuring the terminal device. Especially in the case of a usually very large number of users and terminal devices, an overall advantageous sequence of the method which is particularly inexpensive for an operator of the back-end system can be adjusted in this way by adapting the update logic.

As a result, in addition to operating conditions of a terminal device involved, operating conditions of the back-end system, for example a current load of the back-end system, can also be taken into account when updating the digital navigation map.

In a preferred embodiment, the terminal device generates an update note with a segment identifier associated to a map segment and a specific note type and transfers the generated update note to the back-end system. The update note represents a specific need to update the terminal device, said need being related to a map segment. The note type can serve as a distinguishing feature of the update notes and consequently allow differentiated processing of update notes of different note types. For example, the note type can specify a map segment according to its importance for the user. Likewise, different update paths can be differentiated on the basis of the note type in order to differentiate between the update behavior of the user.

It is also advantageous here that only the terminal device uses position data to determine map segments to be requested. No position data is transferred to the back-end system, only segment identifiers identifying a larger area. Problems with data protection law can thereby be avoided. Due to the assignment of the note list to a user, the same user can use a plurality of different terminal devices to generate update notes and to transfer them to the back-end system.

The back-end system advantageously enters the transferred update note in a note list associated to the user and/or changes an update note entered in the note list, in particular by changing the note type, and/or generates an update note autonomously and enters it in the note list. The user's update notes are therefore collected in the same note list regardless of the terminal device used in each case. On the one hand, redundant transfers of map segments can be avoided in this way. On the other hand, all of the user's update notes can be evaluated for an intelligent update strategy. Apart from this, the update notes in the user's note list reflect an interest, i.e. a movement behavior and an update behavior of the user again and allow the back-end system to learn the need for updates by the user and to adapt the update strategy to the user.

Furthermore, the back-end system creates a priority entry for each update note included in the note list with the segment identifier of the update note and sorts the generated priority entry into a priority list associated to the user according to a priority associated to it by means of a priority table and dependent on the note type of the update note. The priority table assigns a priority value to each note type of an update note, which indicates the urgency of the update. Within a priority value, a finer differentiation may be possible depending on other prioritization criteria relating to the update note.

In a further embodiment, the terminal device installs a transferred update packet and transfers a version number of the installed update packet to the back-end system. The back-end system creates a version entry with the transferred version number and the segment identifier of the installed update packet and enters the generated version entry in a version list associated to the terminal device. The back-end system thus knows the update statuses of the map segments of the digital navigation map in every terminal device of the user at all times.

In a preferred embodiment, the back-end system generates, for each priority entry of the priority list, based on the version list associated to the terminal device, a packet reference with the segment identifier of the priority entry, the version number of the version entry comprising the segment identifier, and a version number of the update packet provided, and sorts the generated transfer entry according to the position of the priority entry in the priority list in the transfer list associated to the terminal device and the user. This method step can also take into account a learned update behavior, for example at what times and with which terminal devices the user generates and transfers update notes. Thus, for a specific update packet, a packet reference can only be sorted into the transfer list associated to a second terminal device of the user after an update period if the specific update packet was not transferred to a first terminal device of the user by the end of the update period. The person skilled in the art can recognize further aspects of an update behavior of a user and take them into account when generating the transfer list.

In one embodiment, the terminal device generates an update note with the note type "place of residence" if the map segment associated to the identifier overlaps with a place of residence area which is defined by a center point and in particular circularly around a specific place of residence radius, and if a first place of place of residence condition is met for the center point, that the terminal device is arranged in the center point daily for a specific first period between night and early morning hours. As a result of the time of day criterion for determining the place of residence, it is not necessary for the user to enter the place of residence. For example, 14 days can be determined as the first period. If a user spends the essential hours of the night at the same place for 14 days without exception, this place is most likely his place of residence.

The circular place of residence area ensures that update notes with the note type "place of residence" are associated to all map segments that correspond to an area around the place of residence having the specified place of residence radius. As a result, the digital navigation map is updated at least within a distance defined by the place of residence radius around the user's place of residence. This does justice to places of residence which are arranged on the edge of a map segment. For example, 50 km can be determined as the place of residence radius. For daily needs, the user usually does not go further than 50 km from the place of residence.

An update note comprising the note type "place of residence" is deleted if a second place of residence condition is met for the center point, that the terminal device is not arranged in the center point daily for a specific second period between the night and the early morning hours. The second period therefore ensures that outdated update notes are deleted from the note list. It should be so long that, for example, a longer absence from the place of residence due to vacation does not lead to the deletion of an update note of the note type "place of residence," for example four weeks. Deleting outdated update notes prevents unnecessary updates and reduces the total data volume transferred for updating.

In a further embodiment, the terminal device generates an update note with the note type "place of work" if the map segment associated to the identifier overlaps with a place of work area which is defined by a center point and in particular circularly around a specific place of work radius and if a first place of work condition is met for the center point that the terminal device is arranged in the center point for a specific first period of time between morning and afternoon hours or between midday and evening hours. As a result of the time-of-day criterion for determining the place of work, the user does not need to input the place of work. For example, the first period can be 14 days. If a user spends the first half of the day or the second half of the day without exception in the same place for 14 days, this place is most likely his or her place of work.

The circular place of work area ensures that update notes with the note type "place of work" are associated to all map segments that correspond to an area around the place of work with the specific place of work radius. As a result, the digital navigation map is updated at least within a distance defined by the place of work radius around the place of work of the user. This does justice to places of work which are arranged on the edge of a map segment. For example, 50 km can be determined as the place of work radius. Usually, the user does not go further than 50 km from the place of work.

An update note comprising the note type "place of work" is deleted if a second place of work condition is met for the center point, that the terminal device is not arranged in the center point for a specific second period daily between the morning and afternoon hours or between the midday and evening hours. The second period therefore ensures that outdated update notes are deleted from the note list. It should be so long that, for example, a longer absence from work due to vacation does not lead to the deletion of an update note of the "place of work" note type, for example four weeks. Deleting outdated update notes prevents unnecessary updates and reduces the total data volume transferred for updating.

In one embodiment, the terminal device generates an update note with the note type "place of destination" if the map segment associated to the identifier overlaps with a place of destination area that is defined by a center point and in particular circularly around a specific place of destination radius and if a first place of destination condition is met for the center point, that the center point has been input by the user as the place of destination of a route into the terminal device and has travelled a specific minimum proportion of the route. Update notes of this note type usually relate to areas which are rarely and/or not regularly visited by the user. They ensure that the digital navigation map is updated in areas around the place of destination. In order not to generate an update note for this note type by possibly entering an incorrect place of destination, the user must have travelled a not insignificant minimum distance on the route to the place of destination.

The circular place of destination area or the circular stopover area ensures that update notes provided with the note type "place of destination" are associated to all map segments that correspond to an area around the place of destination with the specific place of destination radius. As a result, the digital navigation map is updated at least within a distance defined by the place of destination radius around the place of destination or the stopover. For example, 5 km can be determined as the place of destination radius. Usually, the user does not go further than 5 km from the place of destination during a journey.

An update note comprising the note type "place of destination" is deleted if a second place of destination condition is met for the center point, that the center point has been deleted by the user as the place of destination of the route in the terminal device and the terminal device is not arranged in the associated map segment. Accordingly, update notes of the note type "place of destination" or "stopover" that are no longer required are deleted from the user's note list, thereby avoiding unnecessary updates.

The person skilled in the art can easily provide a further note type "stopover" in analogy to the note type "place of destination." Of course, the note types mentioned are to be understood only as examples and not as restrictive. Other note types can be "current location," "driving route," "surroundings of the vehicle," "surroundings of the mobile terminal device," "former place of destination," "former driving route," "forecast," etc., each with suitable first and second conditions.

In a preferred embodiment, the update note is generated by a control unit of a vehicle of the user or a mobile terminal device of the user, in particular a smartphone or a tablet, or a stationary terminal device of the user, in particular a notebook, and transferred to the back-end system. Both a control unit of a vehicle and mobile terminal devices usually include a device for determining the position, for example a satellite receiver for receiving GPS data (Global Positioning System), and a timer. Using these devices, a corresponding update note with a suitable note type can be generated for a map segment on the basis of a position of the terminal device and a time of day.

In further embodiments, a provided update packet is transferred wirelessly via a mobile network into the control unit of the vehicle and/or via the mobile radio network into the smartphone and from the smartphone into the control unit of the vehicle, and/or is transferred wirelessly via the mobile radio network into the tablet and from the tablet into the control unit of the vehicle, and/or in which a provided update packet is transferred via a stationary internet into a local wireless network of the user and from the local wireless network into the control unit of the vehicle and/or via the stationary internet into the notebook, and from the notebook by means of a mobile data storage of the user, in particular by means of a USB stick, to the control unit of the vehicle. To transfer an update packet provided, the method uses a plurality of different update paths, which differ in the respective communication costs. In this way, a transfer that is favorable in terms of time and costs can be determined for each update packet. For example, update packets can be excluded from expensive transfer via the mobile network during the update period if they are usually transferred by the user via other update channels and an update is not absolutely necessary. The control unit of the vehicle can define a maximum transfer duration for transmitting update packets while the vehicle is parked. When the maximum transfer time is reached, the transfer is canceled and continued at a later time. In this way, discharging of a battery of the vehicle during parking is avoided. Furthermore, the control unit can be configured such that functions of the control unit that are different from the transfer of an update packet are not impaired if the update packet is transferred while the vehicle is traveling.

In one embodiment, the update packet is provided as a complete update packet and as an incremental update packet, and the transfer entry is generated with a packet reference that references the complete update packet if a positive version difference in the terminal device between a version number of the update packet provided and a version number of an update packet installed in the terminal device corresponding to the update packet provided is greater than a specific difference value, or is generated with a packet reference referencing the incremental update packet if the version difference is at most equal to the determined difference value. In other words, with small version differences, it may be more suitable to incrementally update a map segment. An incremental update packet has a small data volume and accordingly requires little time to transfer. From a specific version difference, however, this advantage is negligible, so that a complete update packet can be transferred instead. Accordingly, the back-end system can provide a complete update packet and a plurality of incremental update packets for each map segment.

The application is illustrated schematically using an embodiment in the drawings and is further described with reference to the drawings.

Figure 1:
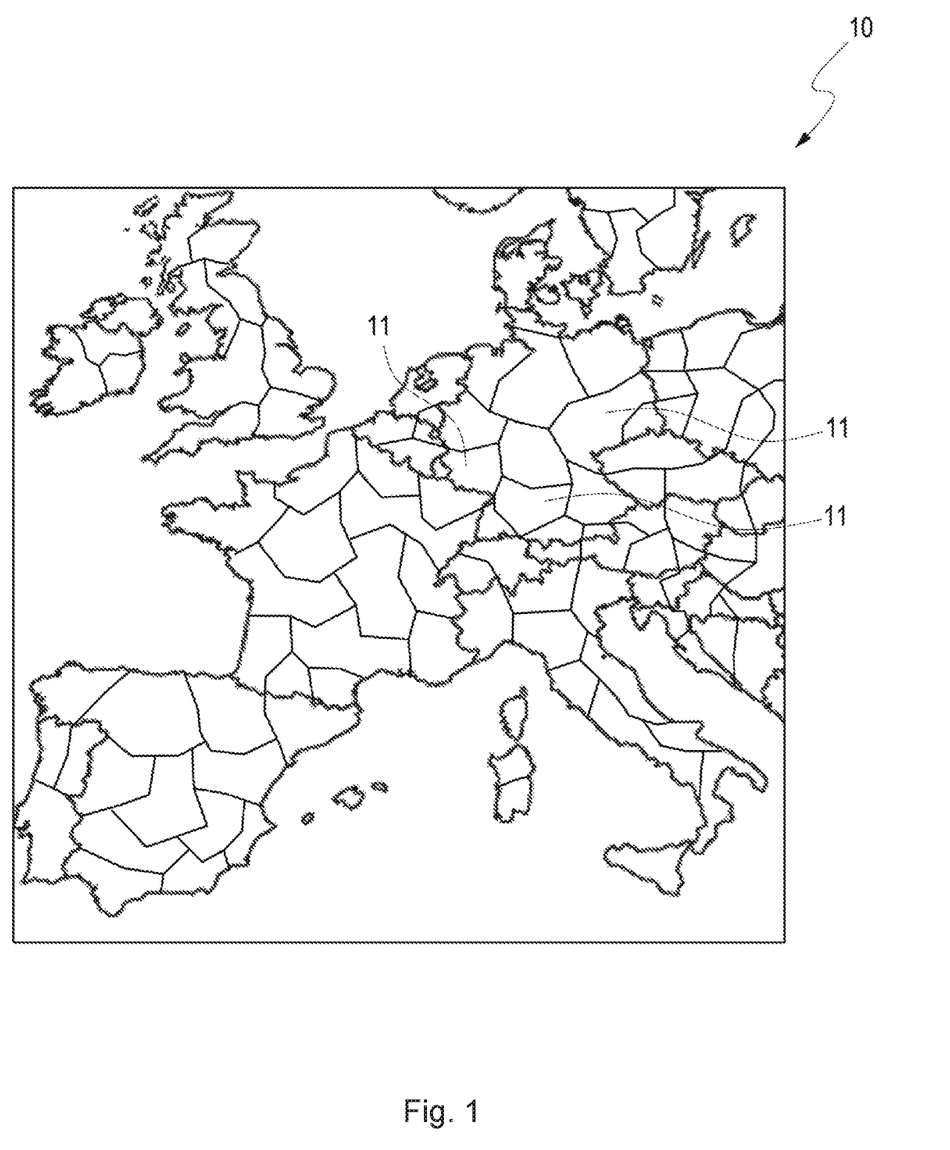
FIG. 1 is a schematic representation of a section of a digital navigation map.

FIG. 1 is a schematic representation of a section of a digital navigation map.

Figure 2:
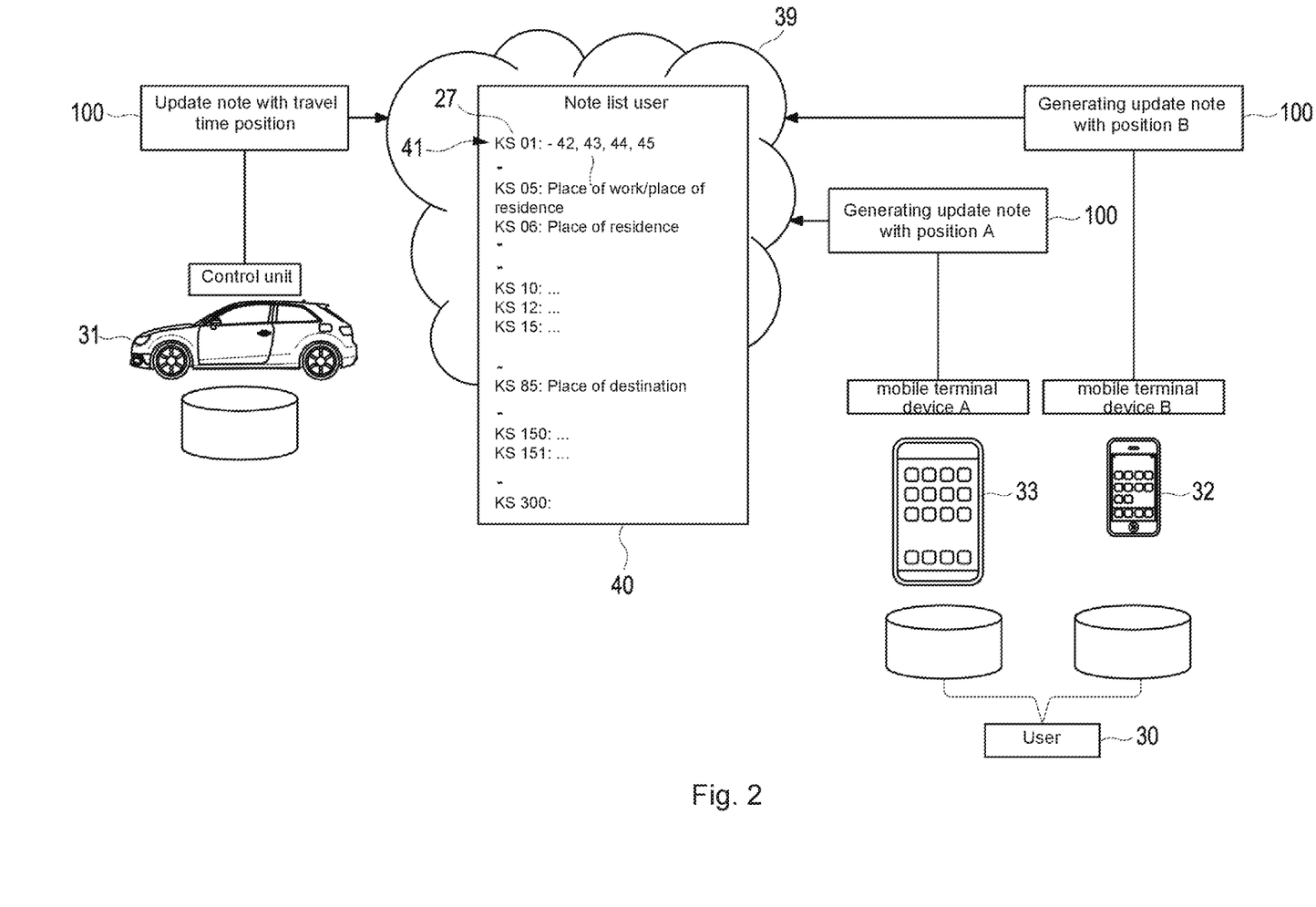
FIG. 2 is a schematic representation of a first section of an embodiment of the method according to the application.

FIG. 2 is a schematic representation of a first section of an embodiment of the method according to the application.

Figure 3:
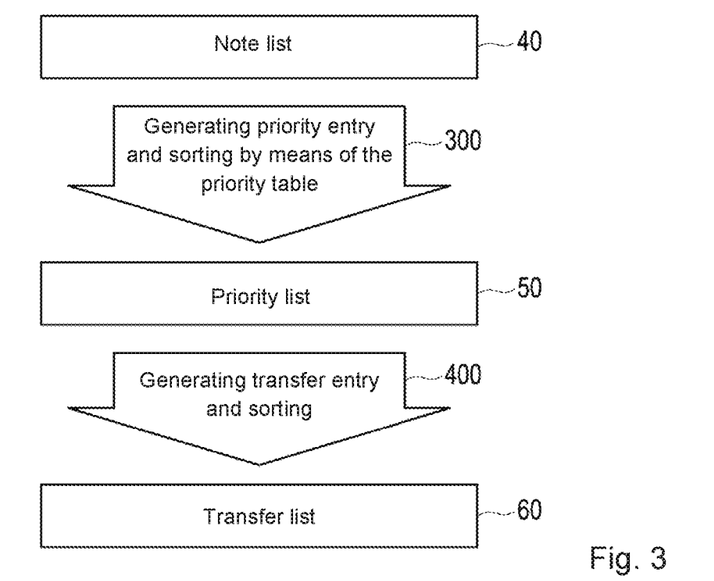
FIG. 3 is a flow chart of a further section of an embodiment of the method according to the application.

FIG. 3 is a flow chart of a further section of an embodiment of the method according to the application.

Figure 4:
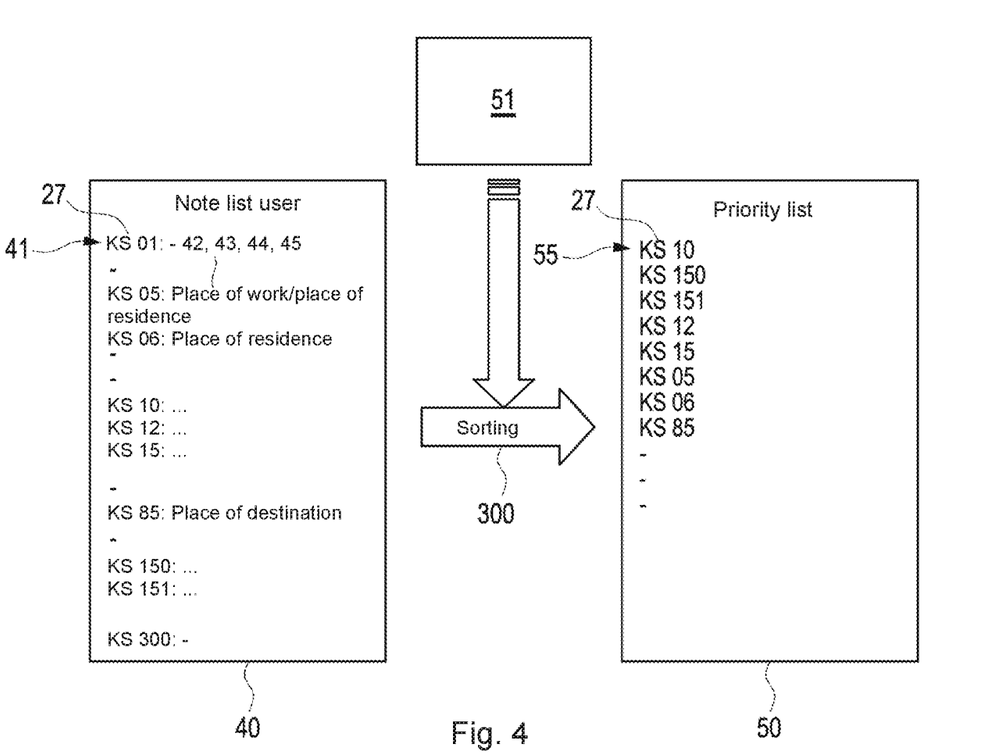
FIG. 4 is an enlarged representation of a detail of the section shown in FIG. 3.

FIG. 4 is an enlarged representation of a detail of the section shown in FIG. 3.

FIG. 5 is an enlarged representation of a detail of the detail shown in FIG. 4.

Figure 6:
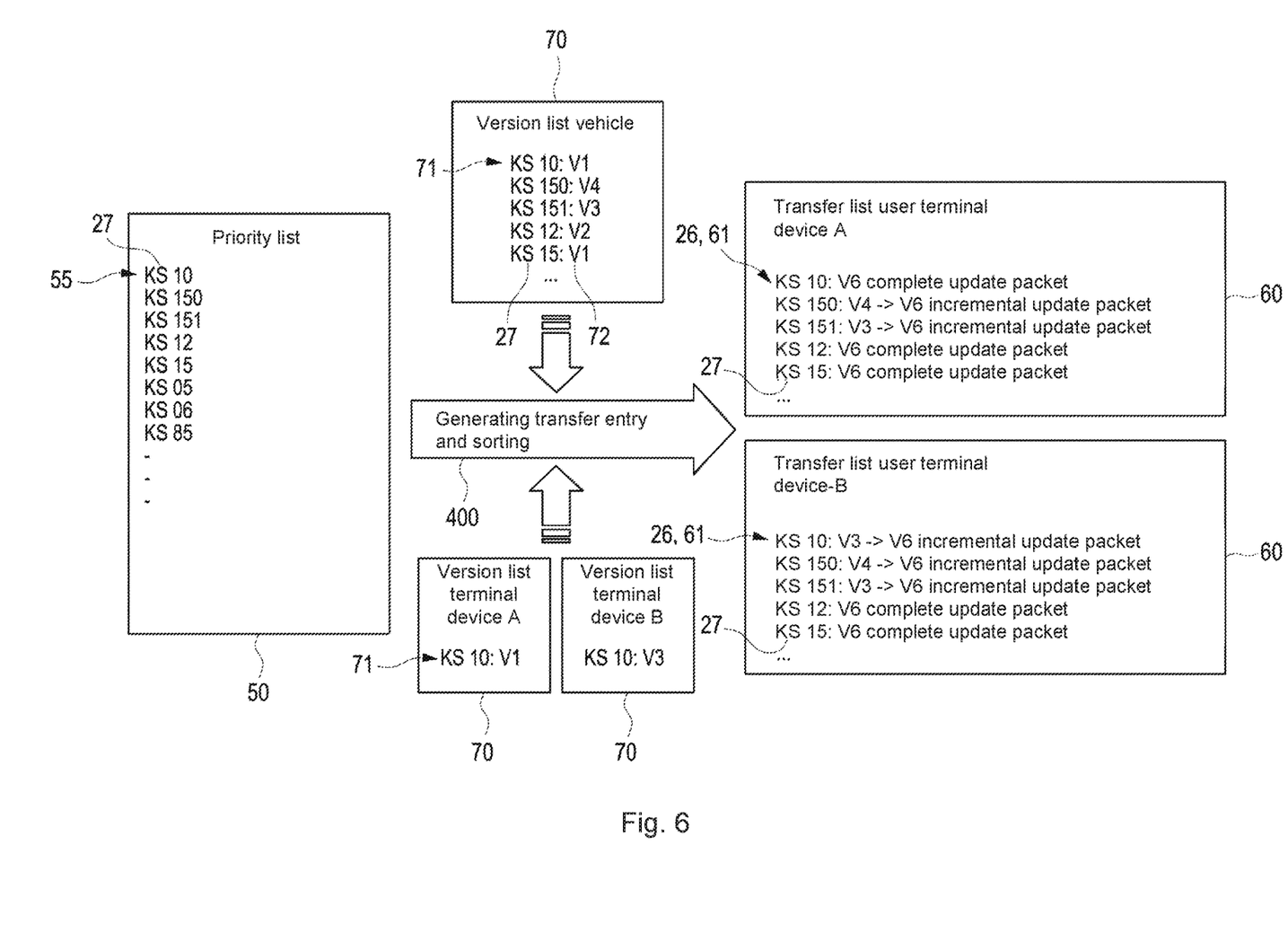
FIG. 6 is an enlarged representation a further detail of the section shown in FIG. 3.

FIG. 6 is an enlarged representation a further detail of the section shown in FIG. 3.

Figure 7:
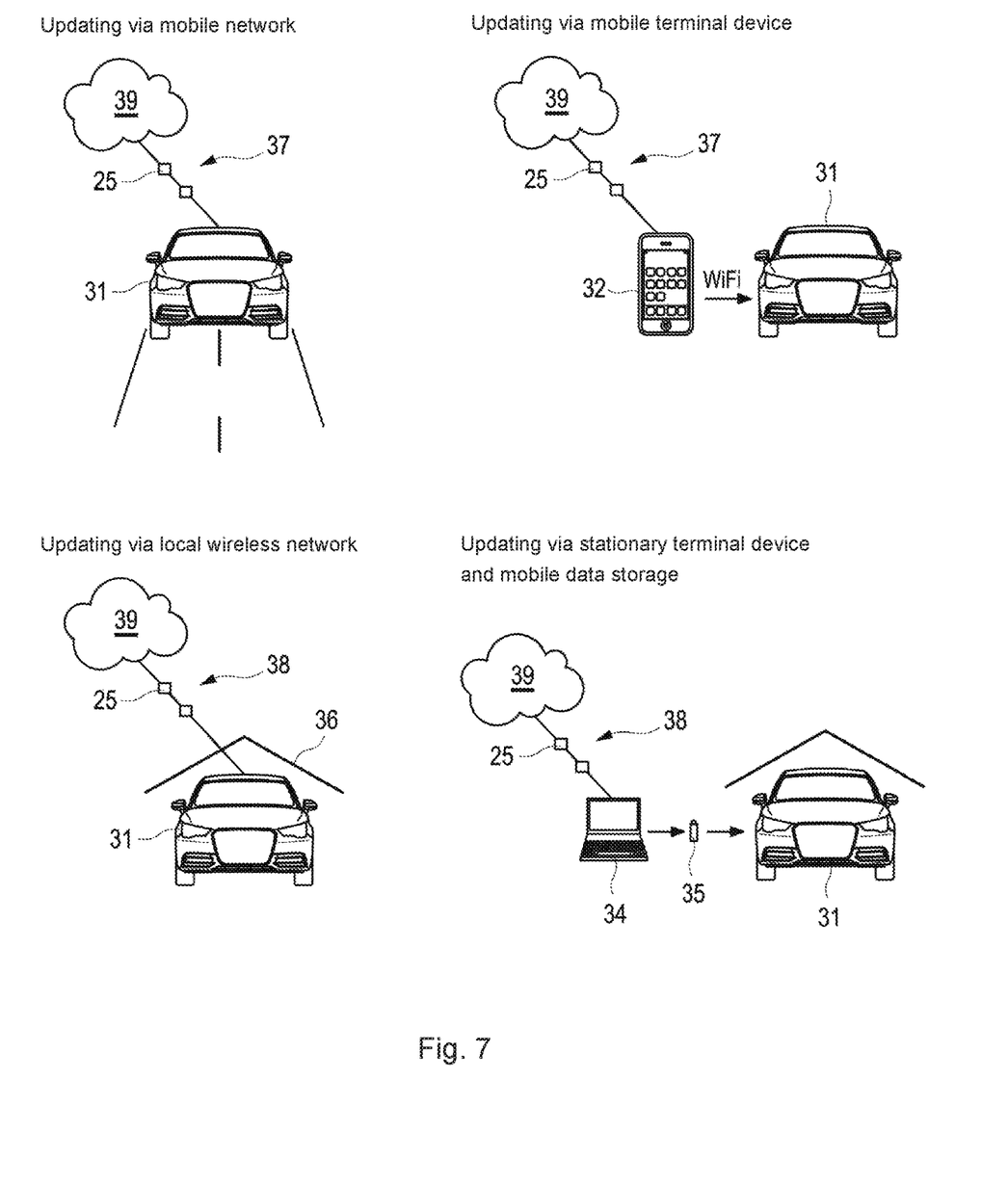
FIG. 7 is a schematic representation a further section of an embodiment of the method according to the application.

FIG. 7 is a schematic representation a further section of an embodiment of the method according to the application.

Figure 8:
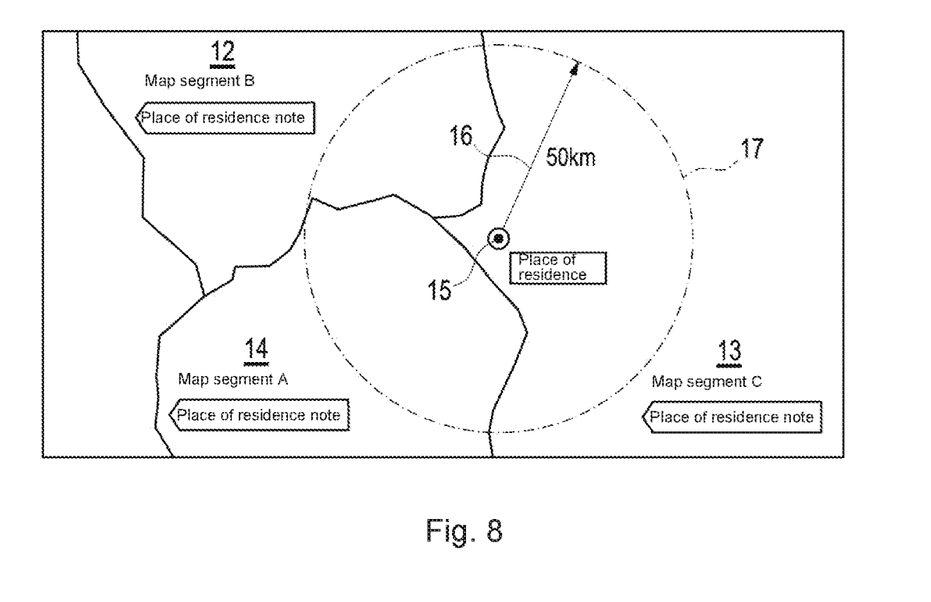
FIG. 8 is an enlarged representation of a detail of the digital navigation map shown in FIG. 1 with a place of residence.

FIG. 8 is an enlarged representation of a detail of the digital navigation map shown in FIG. 1 with a place of residence.

Figure 9:
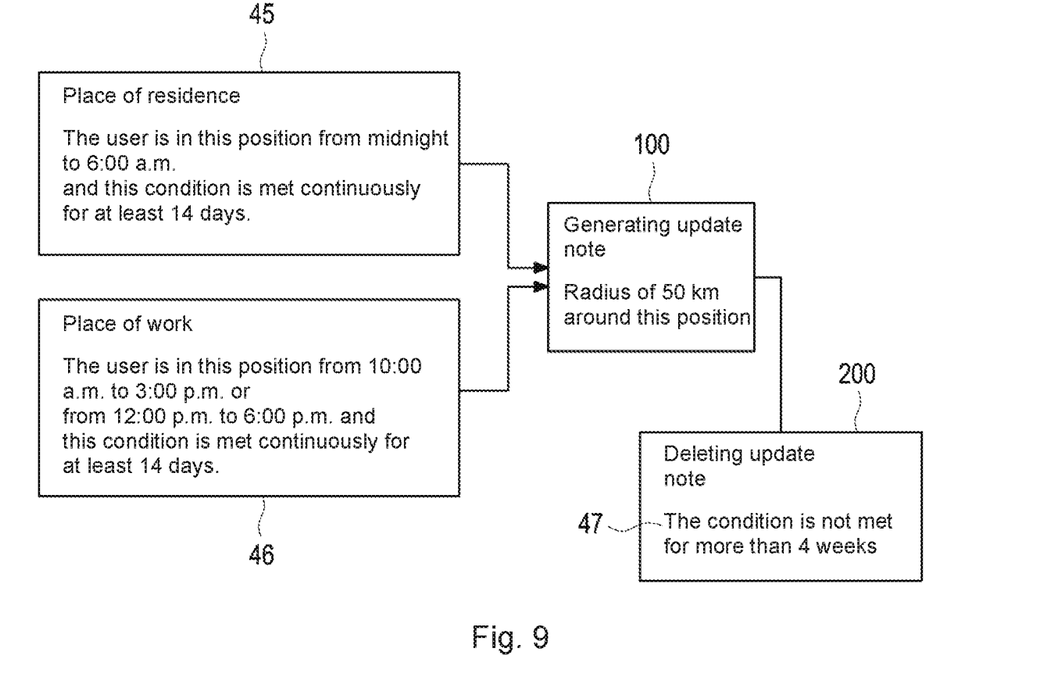
FIG. 9 is a flow chart of a section of an embodiment of the method according to the application related to the detail shown in FIG. 8.

FIG. 9 is a flow chart of a section of an embodiment of the method according to the application related to the detail shown in FIG. 8.

Figure 10:
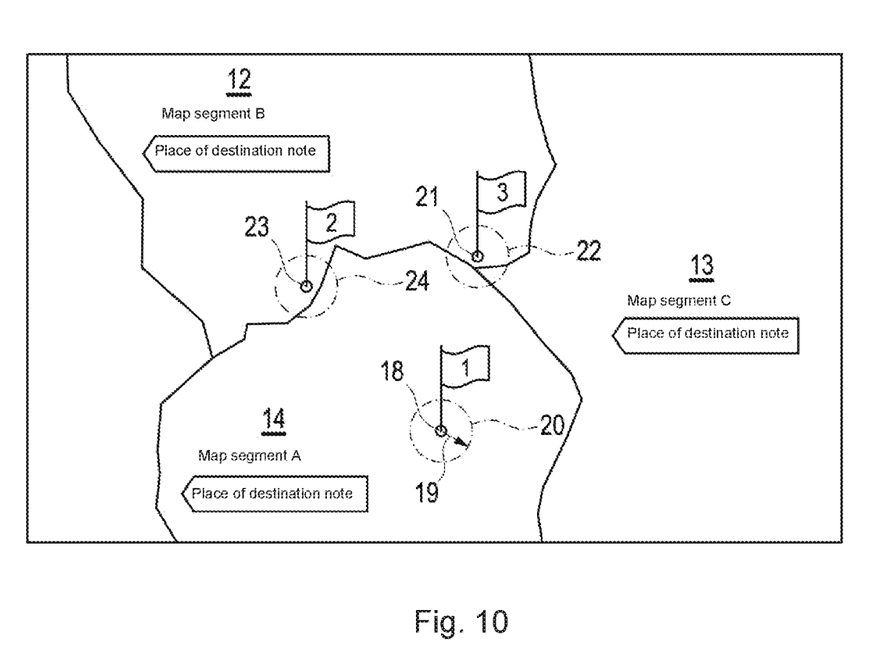
FIG. 10 is an enlarged representation of the detail shown in FIG. 8 with three places of destination.

FIG. 10 is an enlarged representation of the detail shown in FIG. 8 with three places of destination.

Figure 11:
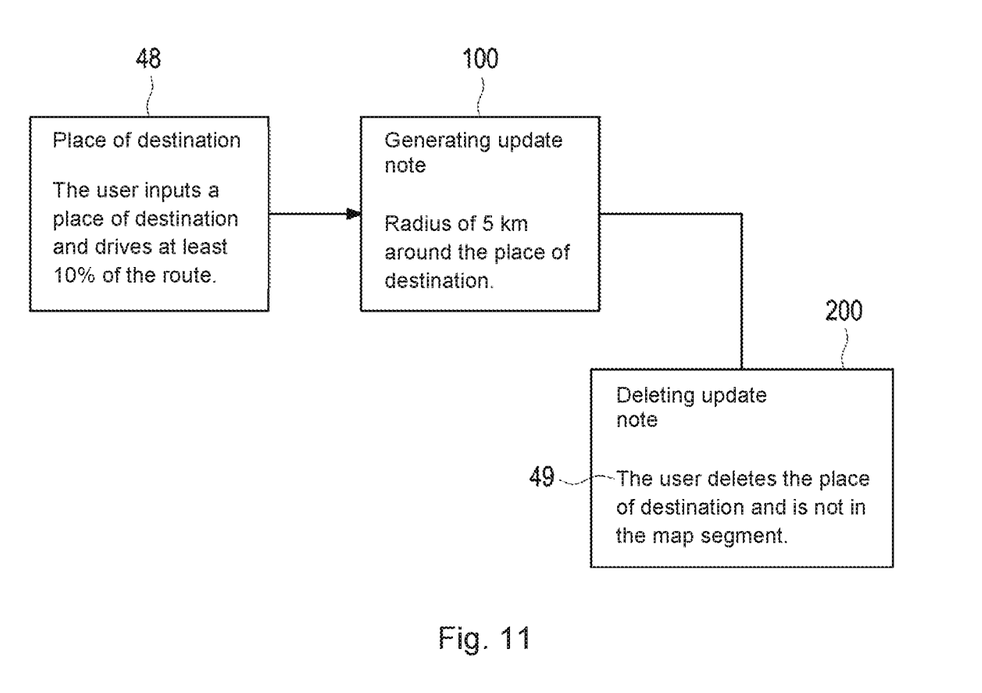
FIG. 11 is a flow chart of a section of an embodiment of the method according to the application related to the detail shown in FIG. 10.

FIG. 11 is a flow chart of a section of an embodiment of the method according to the application related to the detail shown in FIG. 10.

FIG. 1 is a schematic representation of a section of a digital navigation map 10. The digital navigation map 10 comprises a plurality of map segments 11 and corresponds to the European area, but can also map any other portion of the earth's surface. In the method according to the application for updating the digital navigation map 10, a back-end system provides a plurality of update packets, each associated with a map segment 11 of the digital navigation map 10, which are transferred to a user's terminal device if required. The update packets are provided by the back-end system as complete update packets and as incremental update packets.

FIG. 2 is a schematic representation of a first section of an embodiment of the method according to the application. An update note 41 is generated 100 from a control unit of a vehicle 31 of the user 30 or a mobile terminal device of the user 30, here a smartphone 32 or a tablet 33, or a stationary device of the user 30, here a notebook 34 (see FIG. 7) and transferred to the back-end system 39. The update note 41 comprises a segment identifier 27 associated to a map segment and a specific note type 42, 43, 44, 45. The back-end system 39 is designed as an Internet cloud and enters the transferred update note 41 into a note list 40 associated to the user 30. In addition, the back-end system 39 changes update notes 41 entered in the note list 40, in particular by changing the note type 42, 43, 44, 45 depending on an interest, i.e. a movement behavior of the user 30 and/or generates update notes 41 autonomously and enters them in the note list 40.

FIG. 3 is a flow chart of a further section of an embodiment of the method according to the application: The back-end system 39 generates 300 a priority list 50 from the note list 40 and generates 400 a transfer list 60 from the priority list 50.

FIG. 4 is an enlarged representation of a detail of the section shown in FIG. 3. A priority entry 55 with the segment identifier 27 of the update note 41 is generated for each update note 41 included in the note list 40. The generated priority entry 55 is sorted 300 according to a priority 52 associated to it by means of a priority table 51 and dependent on the note type 42, 43, 44, 45 of the update note 41 (see FIG. 5) into a priority list 50 associated to the user 30.

FIG. 5 is an enlarged representation of a detail of the detail shown in FIG. 4. Each entry in the priority table 51 comprises a priority 52, a reason for prioritization 53, which includes note types 42, 43, 44, 45, and further prioritization criteria 54 for differentiating within a priority 52.

FIG. 6 is an enlarged representation of a further detail of the section shown in FIG. 3. The back-end system 39 generates, for each priority entry 55 of the priority list 50, based on the version list 70 associated to the terminal device, a packet reference 26 with the segment identifier 27 of the priority entry 55, the version number 72 of the version entry 71 comprising the segment identifier 27, and a version number of the update packet provided, as well as a transfer entry 61 comprising the generated packet reference 26, and sorts 400 the generated transfer entry 61 into the transfer list 60 associated to the terminal device and to the user 30 according to the position of the priority entry 55 in the priority list 50.

The transfer entry 61 is generated with a packet reference 26 which references a complete update packet if a positive version difference between a version number of the update packet provided and a version number 72 of an update packet corresponding to the update packet installed in the terminal device is greater than a specific difference value, or with a packet reference 26 referencing the incremental update packet generated when the version difference is at most equal to the determined difference value.

After receiving the transfer list 60, the terminal device automatically requests each update packet referenced by a packet reference 26 of a transfer entry 61 of the transfer list 60 generated and transferred by the back-end system 39 from the back-end system 39 according to the order of the transfer entries 61 in the transfer list 60.

FIG. 7 is a schematic representation of a further section of an embodiment of the method according to the application. A provided update packet 25 is transferred from the back-end system 39 to the control unit of the vehicle 31 via a mobile network 37 (Over The Air Update, OTA Update). As an alternative or in addition, the update packet 25 is transferred via the mobile radio network 37 into the smartphone 32 and from the smartphone 32 wirelessly into the control unit of the vehicle 31 or—not shown—via the mobile network 37 into the tablet and from the tablet wirelessly into the control unit of the vehicle 31 (Over The App Update).

Alternatively or additionally, the update packet 25 is transferred via a stationary Internet 38 into a local wireless network 36 of the user 30 and from the local wireless network 36 into the control unit of the vehicle 31 (Over The WiFi Update). Alternatively or additionally, the update packet 25 is transferred via the stationary Internet 38 into the notebook 34 and from the notebook 34 by means of a mobile data storage of the user 30, here using a USB stick 35, into the control unit of the vehicle 31 (customer update).

FIG. 8 is an enlarged representation of a detail of the digital navigation map 10 shown in FIG. 1 with a place of residence. The detail shows three map segments 12, 13, 14, a center point 15 depicting the place of residence, which is arranged in the map segment 13, and a circular place of residence area 17 defined by a place of residence radius 16 of 50 km around the center point 15. The circular place of residence area 17 overlaps with the three map segments 12, 13, 14.

FIG. 9 is a flow chart of a section of an embodiment of the method according to the application related to the detail shown in FIG. 9. If a first place of residence condition 45 is fulfilled, that the terminal device is arranged in the center point 15 in a period of at least 14 days between 0:00 a.m. at night and 6:00 in the morning each, three update notes 41 are each generated 100 with one of the three segment identifiers 12, 13, 14 associated to the map segments 12, 13, 14 and the note type "place of residence" 42.

If a second place of residence condition 47 is fulfilled, that the terminal device is not arranged in the center point 15 between 0:00 and 6:00 a.m. for a specific second period of at least four weeks, each update note 41 with the note type "place of residence" 42 is deleted 200.

The same procedure is followed if the center point 15 shown in FIG. 8 corresponds to a place of work.

If a first place of work condition 46 is met, that the terminal device is arranged in the center point 15 in a period of at least 14 days daily between 10:00 a.m. and 3:00 p.m. or between 12:00 p.m. and 6:00 p.m. three update notes 41 are each generated 100 with one of the three segment identifiers 12, 13, 14 associated to the map segments 12, 13, 14 and the note type "place of work" 43.

If a second place of work condition 47 is met, that the terminal device is not arranged in the center point 15 between 10:00 a.m. and 3:00 p.m. or between 12:00 p.m. and 6:00 p.m. for a specific second period of time, each update note 41 with the note type "place of work" 43 is deleted 200.

FIG. 10 is an enlarged representation of the detail shown in FIG. 9 with three places of destination. The detail comprises three map segments 12, 13, 14, three center points 18, 21, 23, each corresponding to a place of destination, of which the first two center points 18, 21 are arranged in the map segment 12 and the third center point 23 is arranged in the map segment 14. Each center point 18, 21, 23 defines a circular place of destination area 20, 22, 24 defined by a place of destination radius 19 of 5 km around the respective center point 18, 21, 23. The circular place of destination area 20 overlaps with the map segment 14. The circular place of destination area 22 overlaps with the map segments 12, 13, 14. The circular place of destination area 24 overlaps with the map segments 12, 14.

FIG. 11 is a flow chart of a section of an embodiment of the method according to the application related to the detail shown in FIG. 11. If a first place of destination condition 48, that the user 30 has input a place of destination corresponding to the center point 18 and has travelled a specific minimum proportion of a route to the place of destination, an update note 41 with the segment identifier 14 associated to the map segment 14 and the note type "place of destination" 44 is generated 100. Correspondingly, three update notes 41 are generated 100 each having one of the three segment identifiers 12, 13, 14 associated to the map segments 12, 13, 14 and the note type "place of destination" 44 for the center point 21, and two update notes 41 are generated each having one of the two map segments 12, 14 associated to segment identifiers 12, 14 and the note type "place of destination" 44 for the center point 23.

If a second place of destination condition 49, that the user 30 has deleted the input place of destination corresponding to the center point 18 and the terminal device is not arranged in the map segment 14, the update note 41 with the map identifier 14 associated to the map segment 14 and the note type "place of destination" 44 are deleted 200. Under corresponding second place of destination conditions 49, the update notes with the segment identifiers 12, 13, 14 and the note type "place of destination" 44 are deleted for the center point 21 and the update notes with the segment identifiers 12, 14 and the note type "place of destination" 44 are deleted 200 for the center point 23.

The method according to the application offers the advantage that the map segments 11, 12, 13, 14 of the digital navigation map 10 installed in a terminal device of the user 30 are updated depending on the behavior and interest of the user 30. As a result of the fact that map segments 11, 12, 13, 14 which are not of interest to the user 30 are not updated, or are updated at most very rarely, the data volume to be transferred for updating the digital navigation map 10 is reduced. In addition, update packets 41 can also be transferred to the control unit of the vehicle 31 via the wireless network 36, the notebook 34 with the USB stick 35, and via the smartphone 32 and the tablet 33 of the user 30. In this way, the data volume to be transferred via a mobile network 37 is reduced, which is accompanied by a corresponding reduction in the mobile communication costs. Apart from this, update packets 41 can be transferred in advance or with a specific maximum time delay in order to use different transfer paths from the mobile network 37.

LIST OF REFERENCE SIGNS 10 digital navigation map
11 map segment
12 map segment
13 map segment
14 map segment
15 center point
16 place of residence radius
17 place of residence area
18 center point
19 place of destination radius
20 place of destination area
21 center point
22 place of destination area
23 center point
24 place of destination area
25 update packet
26 packet reference
27 segment identifier
30 user
31 vehicle
32 mobile terminal device
33 mobile terminal device
34 stationary terminal device
35 mobile data storage
36 local wireless network
37 mobile network
38 stationary internet
39 back-end system
40 note list
41 update note
42 note type "place of residence"
43 note type "place of work"
44 note type "place of place of destination"
45 first place of residence condition
46 first place of work condition
47 second place of residence condition/second place of work condition
48 first place of destination condition
49 second place of destination condition
50 priority list
51 priority table
52 priority
53 reason for prioritization
54 criterion for prioritization
55 priority entry
60 transfer list
61 transfer entry
70 version list
71 version entry
72 version number
100 creating an update note
200 deleting an update note
300 sorting into a priority list
400 sorting into a transfer list

The invention claimed is:

1. A method for updating a digital navigation map comprising a plurality of map segments, the method comprising:
generating, by a terminal device of a user, an update note, wherein the update note comprises a segment identifier associated with a map segment and a note type that represents a concrete need for updates of the terminal device;
transferring, by the terminal device, the update note to a back-end system;
entering, by the back-end system, the update note into a note list associated with the user;
generating, by the back-end system, a priority entry associated with the segment identifier of the update note for each update note included in the note list;
sorting, by the back-end system, the priority entry into a priority list associated with the user according to a priority, wherein the priority is associated with the priority entry based on a priority table, wherein the priority depends on the note type of the update note;
installing, by the terminal device, a transferred update packet;
transferring, by the terminal device, a version number of the transferred update packet to the back-end system;
generating, by the back-end system, a version entry associated with the version number and the segment identifier of the transferred update packet;
entering, by the back-end system, the version entry into a version list associated with the terminal device;
generating, by the back-end system, a packet reference for each priority entry of the priority list based on the version list associated with the terminal device, wherein the packet reference comprises the segment identifier of the priority entry, the version number of the version entry comprising the segment identifier, and a version number of a provided update packet;
generating, by the back-end system, a transfer entry comprising the packet reference;
sorting, by the back-end system, the transfer entry in a transfer list according to a position of the priority entry in the priority list, wherein the transfer list is associated with the terminal device and the user; and
automatically receiving, by the terminal device from the back-end system, the provided update packet, which is referenced from the packet reference of the transfer entry of the transfer list generated and transferred by the back-end system according to the order of the transfer entries in the transfer list,
wherein the provided update packet is associated with one of the plurality of map segments of the digital navigation map.

2. The method according to claim 1, further comprising changing, by the back-end system, the update note entered into the note list by changing the note type and/or autonomously generating a new update note and entering it into the note list.

3. The method according to claim 1, further comprising:
generating, by the terminal device, a second update note with a place-of-residence note type, when the map segment associated with the segment identifier overlaps with a place of a residence area that is defined by a center point and lies circularly around a specific place of a residence radius and when the center point fulfills a first place-of-residence condition, wherein the first place-of-residence condition is fulfilled if the terminal device is in the center point for a specific first period of time daily between night and early morning hours; and deleting, by the terminal device, the second update note comprising the place-of-residence note type if a second place-of-residence condition is met for the center point, wherein the second place-of-residence condition is met if the terminal device is not in the center point for a specific second period daily between the night and early morning hours.

4. The method according to claim 1, further comprising:

generating, by the terminal device, a third update note with a place-of-work note type when the map segment associated with the segment identifier overlaps with a place of a work area that is defined by a center point and lies circularly around a specific place of a work radius and when the center point meets a first place-of-work condition, wherein the center point meets the first place-of-work condition if the terminal device is in the center point for a specific first period of time daily between morning and afternoon hours or between midday and evening hours; and deleting, by the terminal device, the third update note comprising the place-of-work note type if a second place-of-work condition is met for the center point, wherein the second place-of-work condition is met if the terminal device is not arranged in the center point for a specific second period daily between the morning and afternoon hours or between the midday and evening hours.

5. The method according to claim 1, further comprising:

generating, by the terminal device, a fourth update note with a place-of-destination note type when the map segment associated with the segment identifier overlaps with a place of a destination that is defined by a center point and lies circularly around a specific place of a destination radius and when a first place-of-destination condition is met for the center point, wherein the first place-of-destination condition is met if the user has input the center point as the place of the destination of a route into the terminal device and has travelled a specific minimum proportion of the route; and deleting, by the terminal device, the fourth update note comprising the place-of-destination note type if a second place-of-destination condition is met for the center point, wherein the second place-of-destination condition is met if the center point has been deleted by the user as the place of the destination of the route in the terminal device and the terminal device is not in the map segment.

6. The method according to the claim 1, wherein the update note is generated and transferred to the back-end system from a control unit of a vehicle of the user or a mobile device of the user, wherein the mobile device is a smartphone, a tablet, or a stationary terminal device of the user.

7. The method according to claim 6, further comprising:

transferring the provided update packet wirelessly via a mobile radio network into the control unit of the vehicle;

transferring the provided update packet wirelessly via the mobile radio network into the smartphone and from the smartphone into the control unit of the vehicle;

transferring the provided update packet wirelessly via the mobile radio network into the tablet and from the tablet into the control unit of the vehicle;

transferring the provided update packet via a stationary internet into a local wireless network of the user and from the local wireless network into the control unit of the vehicle; or transferring the provided update packet via the stationary internet into the notebook and from the notebook to the control unit of the vehicle by means of a mobile data storage of the user, wherein the mobile data storage is a USB stick.

8. The method according to claim 1, further comprising:

generating, by the back-end system, the transfer entry with the packet reference that references a complete update packet if a positive version difference in the terminal device between the version number of the provided update packet and the version number of the transferred update packet installed in the terminal device is greater than a specific difference value; or generating, by the back-end system, the packet reference referencing an incremental update packet if the positive version difference is less than or equal to the specific difference value, wherein the provided update packet is the complete update packet and the incremental update packet.

* * * * *